United States Patent Office 2,898,081
Patented Aug. 4, 1959

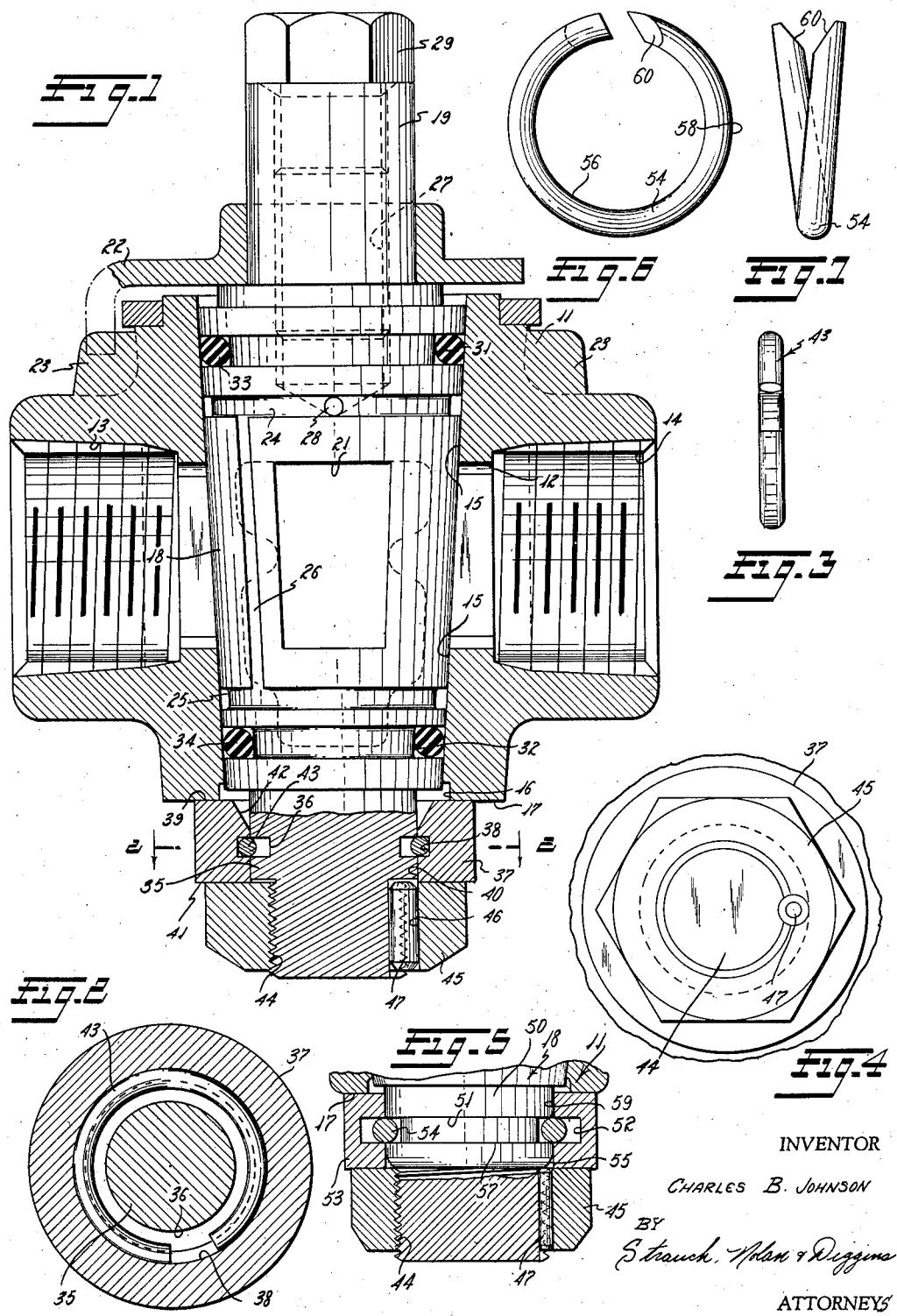

2,898,081

PLUG VALVE WITH DISASSEMBLY PREVENTION MEANS

Charles B. Johnson, Pittsburgh, Pa., assignor to Rockwell Manufacturing Company, Pittsburgh, Pa., a corporation of Pennsylvania Application March 23, 1955, Serial No. 496,150

4 Claims. (Cl. 251—309)

This invention relates to plug valves and particularly to a tamper proof construction therefor.

Plug valves of the type with which the invention is concerned are often used in gas lines at points where they are accessible to householders, workmen and others who may tamper with them. Some of these people actually disassemble and reassemble the valve, often improperly so that accidents occur, and as a safety measure efforts have been directed toward the provision of special locks or seals to prevent or discourage the foregoing practices. The invention provides a novel, simple and entirely adequate solution of the problem by locking the plug in the valve body in such a manner that the plug retaining means must be mutilated to remove the plug, such mutilation being readily detected by inspection. This discourages the plug tampering practices.

It is therefore the major object of the invention to provide a novel plug valve assembly wherein the plug is retained in the body by locking means that are inaccessible without mutilating the retaining means.

A further object of the invention is to provide a tapered plug valve assembly wherein the small end of the plug projects through the body to be surrounded by a retainer collar which is internally grooved opposite a matching groove in the plug for mounting a normally concealed locking spring ring.

It is a further object of the invention to provide a novel tapered plug valve assembly wherein the seating surfaces between the plug and body are lubricated and sealed by plastic lubricant under pressure and O-ring seals are provided at the large and small ends of the plug to retain the lubricant, prevent leakage of line fluid and keep out foreign matter.

Further objects will appear in connection with the appended claims and the annexed drawings wherein:

Figure 1 is a side elevation mainly in section illustrating my tamper-proof plug seating arrangement and the O-ring sealing of the plug;

Figure 2 is a section on line 2—2 of Figure 1 showing the locking ring in the assembly;

Figure 3 is an end elevation of the expanded locking ring;

Figure 4 is an end view of the plug valve assembly showing the locking pin.

Figure 5 is a fragmentary sectional view of a modified form of the invention at the lower end of the plug; and Figures 6 and 7 are side and end views respectively of a snap ring usable in the Figure 5 embodiment of the invention.

Referring to the embodiment of Figures 1-4, a valve body 11 is formed with a transverse fluid passage 12 terminating at opposite ends in threaded pipe couplings 13 and 14 and intersected at right angles by a smooth tapered bore 15. At its smaller end the tapered bore 15 is surrounded by an annular shoulder 16 countersunk in the flat smooth annular surface 17 that lies in a plane normal to the axis of bore 15.

A tapered valve plug 18 is rotatably seated in bore 15 and has an operating stem 19 projecting through the larger end of bore 15. A transverse plug port 21 may be of round or rectangular cross section as illustrated, and passage 12 of corresponding shape. Plug 18 is rotatable between 90° apart limit positions, the fully closed position being shown in Figure 1 and in the fully open position port 21 aligns with passage 12. A suitable sector stop 22 on the stem and associated lugs 23 on the body determine this 90° limit rotation.

The surface of plug 18 contains upper and lower circumferential grooves 24 and 25 connected by a longitudinal groove 26. A lubricant reservoir chamber 27 in the valve stem is connected by passage 28 to groove 24 and a lube screw 29 threaded into the chamber may be turned to displace lubricant under pressure into the grooves.

Spaced above and below the lubricant grooves 24 and 25 are parallel circumferential grooves 31 and 32 in which are disposed annular circular cross section rubber or like resilient material O-ring seal members 33 and 34 which are laterally compressed between the bottom of each groove and the bore 15 to seal the bore against outward escape of line fluid or lubricant and against entry of moisture or dirt.

In assembly the tapered plug 18 is thrust small end first through the large end of bore 15 until it seats on the bore. Where it projects through the smaller end of bore 15 the plug 18 is provided with an integral preferably cylindrical extension 35 having intermediate its ends a continuous surface groove 36. A retainer collar 37 surrounds plug extension 35 with an axial sliding fit and is formed with a continuous internal groove 38 which is disposed opposite plug groove 36. The opposite collar ends 39 and 41 are flat parallel surfaces perpendicular to the collar axis and in the assembly surface 39 lies slidably against the plug body surface 17. At its inner end the bore 40 of collar 37 is chamfered to provide an inclined inwardly diverging annular surface 42 for a purpose to appear.

A split locking ring 43 of Phosphor bronze spring wire is disposed in grooves 36 and 38 between collar 37 and the plug extension 35. This ring 43 is shown expanded in Figure 3. It is preferably generally circular and may be compressed substantially in a plane until its ends abut. Both grooves 36 and 38 are wide enough (axially of the plug) to permit free expansion of the spring 43 during assembly. The radial depth of collar groove 38 is however less than the diameter of the wire of spring 43 so that spring 43 cannot expand entirely into groove 38 and as a result in the assembly spring 43 bridges grooves 36 and 38 to thereby lock the collar and plug together against axial separation while permitting free turning of the plug during operation.

In assembly the spring ring 43 is snapped into plug groove 36 and then collar 37 is pushed over plug extension 35. Surface 42 cams spring 43 to compress and displace spring 43 below the surface of plug extension 35 until grooves 36 and 38 become aligned, and then spring 43 expands outwardly into groove 38. Groove 36 is deep enough to wholly receive the contracted ring 43 but, since groove 38 is not as deep as the diameter of the spring wire, spring 43 in the assembly projects into groove 36 and thus bridges both grooves and thereby provides a lock against relative axial shift of collar 37 and plug 18.

Beyond locking extension 35 the small end of plug 18 is formed with a reduced threaded section 44 on which is mounted a nut 45. A locking pin bore 46 is drilled axially through the threaded interengaging peripheries of plug section 44 and nut 45, and a pin 47 is forced into bore 46 below the end surface of nut 45 but stopping short of collar 37. In assembly bore 46 is not drilled and pin 47 inserted until nut 45 has been drawn up enough to provide the desired plug seating pressure in bore 18. The parts are so dimensioned that after the nut 45 has been drawn up enough to contact collar 37 the plug seating pressure is substantially correct but if need be nut 45 can be further rotated slightly to pull the plug 18 into tighter engagement with bore 15. This may slightly deform ring 43 if the relative axial displacement of plug extension 35 and collar 37 exceed the tolerance provided by the groove widths, but that is unimportant and even helps the locking action.

The spring 43 is usually made of tempered Phosphor bronze spring wire of about 0.08" diameter and when relaxed as in Figure 3 its outer periphery lies in a circle of about 0.830" diameter which is also the diameter of the bottom of collar groove 38. The axial dimension of groove 38 is abut 0.09", while the axial dimension of groove 36 is about 0.085", and these dimensions usually enable the seating pressure adjustment of nut 45 to be obtained without binding ring 43 so as to interfere with plug rotation, and without altering the sealing effect of O-rings 34. The radial depth of groove 38 is less than 0.080 inch and the radial depth of groove 36 is appreciably more than 0.080 inch to enable the spring ring to be compressed therein during assembly.

In the embodiment of Figures 5–7 the plug and body structure is the same as in Figure 1 but the tamper proof locking structure is different. Here the plug extension 50 like plug extension 35, is formed with an intermediate annular groove 51 which in the assembly lies opposite groove 52 in the surrounding collar 53. A split snap ring or spring ring 54 bridges the grooves in the assembly so that while collar 53 may rotate about its axis it is locked against axial shift and the locking means is inaccessible without mutilating the collar.

The lower end of the plug extension is a reduced threaded portion 44 on which is mounted nut 45 locked by pin 47 as in Figure 1.

However between groove 51 and the threaded portion 44, the plug extension surface is tapered as indicated at 55. This may be a conical taper or the surface may be rounded as illustrated but in any event it provides a surface symmetrical about the plug axis gradually increasing in size toward the groove 51, and the purpose of this surface is to expand the spring ring 54 during assembly. This surface will be generally referred to as tapered in the claims.

The relative radial depths of square cut grooves 51 and 52 are the reverse of that of Figure 1. In Figure 5 the collar groove 52 has a radial depth that is greater than the diameter of the wire of ring 54, while that of groove 51 is less than the wire diameter. The axial dimension of both grooves is about the same and at least equal to the wire diameter.

Spring ring 54 normally tends to assume the condition of Figure 6 where it is essentially circular. Its inner diameter 56 is less than the diameter of the plug extension at the lower edge 57 of groove 51 but may be slightly greater than the inside diameter of the groove 51. The outer diameter 58 of spring ring 54 is greater than the inner diameter 59 of collar 53 and less than the diameter of groove 52.

In assembly the relaxed ring of Figure 6 is snapped into place within the collar 53 and it assumes substantially the position relative to the collar as is shown in Figure 5. The collar is then slipped over the tapered plug surface 55 which contacts the inner ring diameter 56 and cams the ring 54 out to expand it entirely into groove 52 during axial movement of the collar. As soon as grooves 51 and 52 are opposite, the ring 54 contracts toward relaxed condition and projects partially into both grooves 51 and 52 to provide the same type of axial lock for the collar as in Figure 1.

If desired the spring ends may be beveled as shown at 60, and the ring may have its ends diverging somewhat as shown in Figure 7, but such is not essential to the invention.

I have thus provided a mechanically simple tamper proof plug valve assembly wherein a collar at the small end of the plug conceals a locking device preventing unauthorized removal of the plug from the body. This is independent of the lubricant pressure sealing O-rings which are disposed above and below the zone of lubricant under pressure and eliminate the need for any other or special pressure tight lubricant seals in the assembly and do not interfere with plug rotation or seat pressure adjustment. While the spring locking rings for the collar normally tend to expand radially of the plug, they exert no seating pressure force on the plug in the assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly, a body having a fluid flow passage intersected by a tapered bore that is open at opposite ends, a tapered valve plug rotatably mounted in said bore and having a transverse port adapted to be aligned with said passage when the valve is open, said plug having an extension projecting through the smaller end of said bore and a stem projecting through the other end of said bore externally of said body; means forming a lock completely and permanently inaccessible for unlocking manipulation and preventing removal of said plug from said bore while providing for limited adjustment of the position of said plug relative to said bore comprising a retainer collar closely surrounding said plug extension adjacent said body at said one end of said bore, aligned cooperating circumferential external and internal recesses in the adjacent external and internal surfaces of said plug extension and collar respectively concealed by said collar, a wholly concealed radially expansible and contractible spring retainer ring of slightly smaller cross-section than the cross-sectional dimension of at least one of said recesses axially of said collar and radially bridging said recesses in said assembly effectively limiting relative axial displacement of said plug and collar to a predetermined small range, the position of said recesses axially of said collar and said plug extension being such that the axial spacing of said extension recess from the body bore one end against which the said plug is seated in said bore is substantially equal to the axial spacing of said collar recess from the end of said collar adjacent said body bore one end; means on said extension engaging said collar for shifting the position of said collar axially of said extension within said range with said ring in position in said recesses to adjust the seating of said plug in said bore and normally frictionally retaining said collar for rotation with said plug extension and means for locking the adjusted position of said adjusting means.

2. The assembly defined in claim 1 wherein said extension has an externally threaded end section beneath said collar and wherein said collar shifting means is a nut threaded on said extension end section.

3. In the plug valve assembly defined in claim 2, wherein said locking means comprises an axial locking pin having a force fit in a bore bridging said nut and said plug extension end section for maintaining the parts in final assembly.

4. In the plug valve assembly defined in claim 1, one of said circumferential recesses having a depth at least equal to the radial thickness of said spring retainer ring and the other of said circumferential recesses having a depth less than the radial thickness of said spring retainer ring whereby during assembly said spring ring may be forced wholly into said one circumferential recess and when assembly is complete allowed to normalize to extend partly into both said circumferential recesses.

References Cited in the file of this patent

UNITED STATES PATENTS

| | | |
|---|---|---|
| 123,584 | Shriver | Feb. 13, 1872 |
| 231,283 | Cushing | Aug. 17, 1880 |
| 738,503 | Waters | Sept. 8, 1903 |
| 867,399 | McGill | Oct. 1, 1907 |
| 2,492,006 | Raybould | Dec. 20, 1949 |
| 2,539,106 | Schenck | Jan. 23, 1951 |
| 2,653,791 | Mueller | Sept. 29, 1953 |
| 2,664,263 | Stadler | Dec. 29, 1953 |

FOREIGN PATENTS

| | | |
|---|---|---|
| 883,374 | Germany | July 16, 1953 |